United States Patent [19]

Solomon

[11] 4,357,080
[45] Nov. 2, 1982

[54] EYEGLASS FRAME HAVING REMOVABLE LENS

[75] Inventor: Charles I. Solomon, San Antonio, Tex.

[73] Assignee: Sol-Optics, Inc., San Antonio, Tex.

[21] Appl. No.: 189,229

[22] Filed: Sep. 22, 1980

Related U.S. Application Data

[63] Continuation-in-part of Ser. No. 124,541, Feb. 25, 1980, Pat. No. 4,304,469.

[51] Int. Cl.³ .......................... G02C 1/08; G02C 1/00
[52] U.S. Cl. ...................................... 351/86; 351/154
[58] Field of Search .................. 351/86, 154, 140, 106

[56] References Cited

U.S. PATENT DOCUMENTS

| | | | |
|---|---|---|---|
| 1,308,477 | 7/1919 | Blanchard | 351/86 |
| 2,652,746 | 9/1953 | Shanks | 351/86 |
| 2,738,709 | 3/1956 | Matthews et al. | 351/86 |

FOREIGN PATENT DOCUMENTS

| | | | |
|---|---|---|---|
| 1055825 | 2/1954 | France | 351/86 |
| 1190806 | 4/1959 | France | 351/86 |

*Primary Examiner*—Vincent P. McGraw
*Assistant Examiner*—Rodney B. Bovernick
*Attorney, Agent, or Firm*—Gunn, Lee & Jackson

[57] ABSTRACT

An eyeglass frame having removable lenses consisting of lens rings to which are secured movable upper or lower lens hooks receiving a removable lens. The frames may be utilized for interchangeable prescription, non-prescription, safety glasses and sunglasses. Movable upper or lower hooks complete the retention means for retaining the lenses in the eyeglass frame. Nine species of movable upper or lower hooks are visualized. The preferred species is a rotatable hook. Other species visualized are spring loaded projection, frictional slide projection, a projecting tilt arm, and screwable hooks.

4 Claims, 29 Drawing Figures

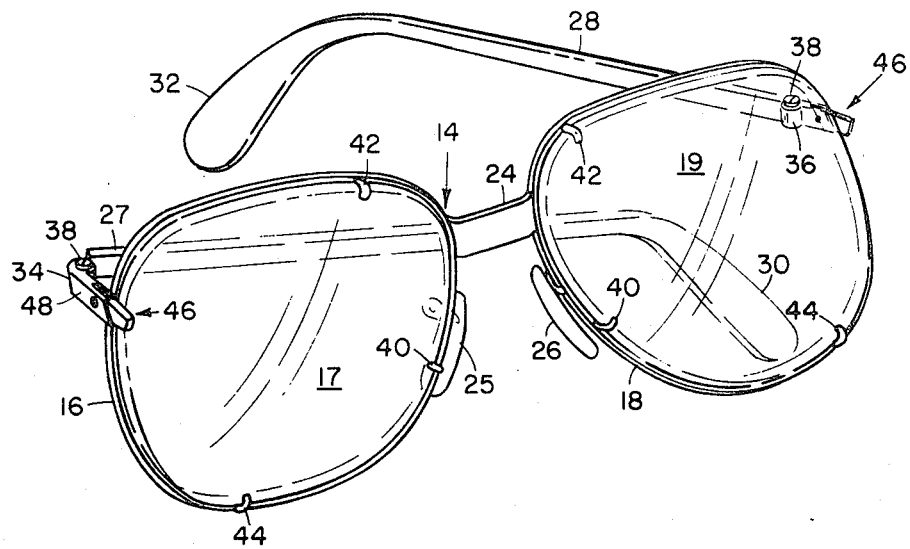
FIG. 1
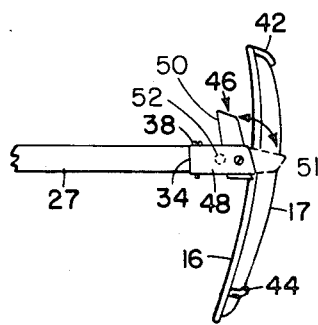
FIG. 2
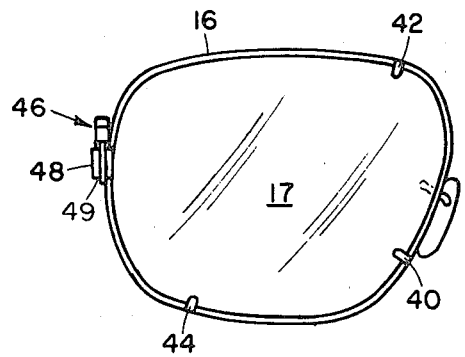
FIG. 3
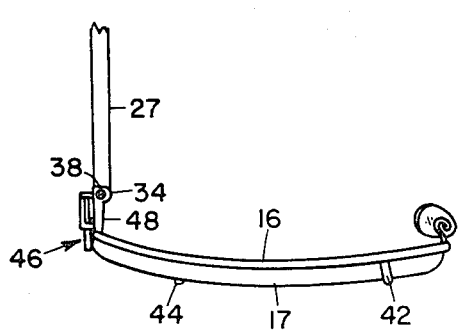
FIG. 5
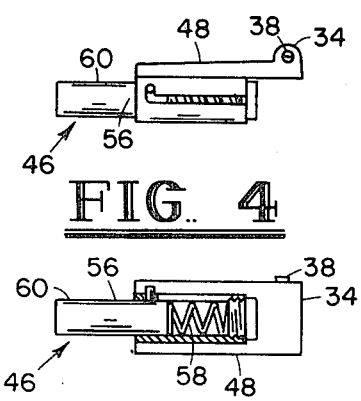
FIG. 4
FIG. 6

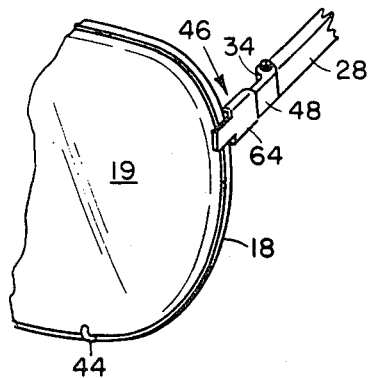
FIG. 7
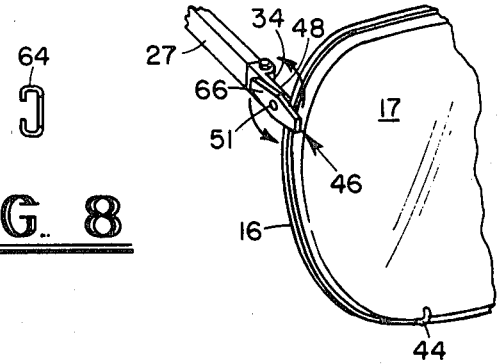
FIG. 8
FIG. 9
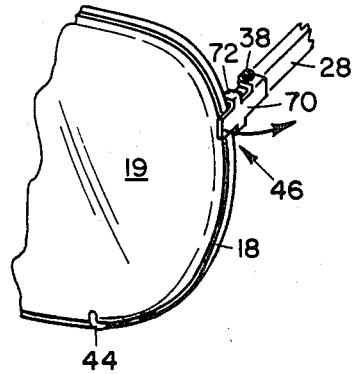
FIG. 10
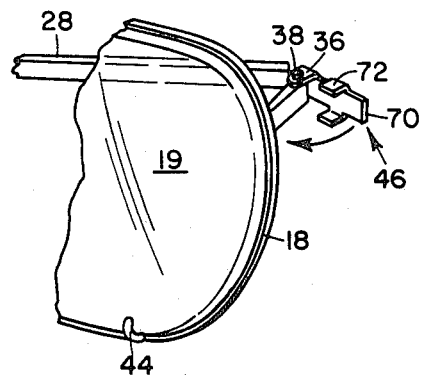
FIG. 11
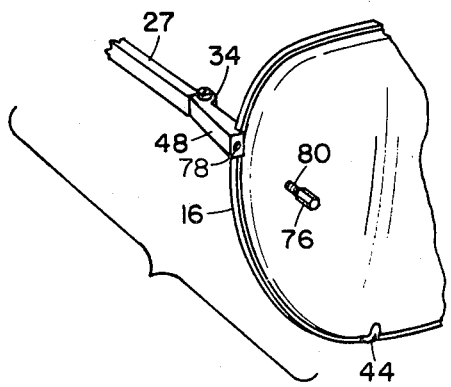
FIG. 12
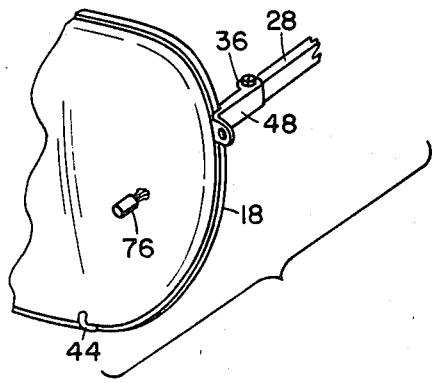
FIG. 13

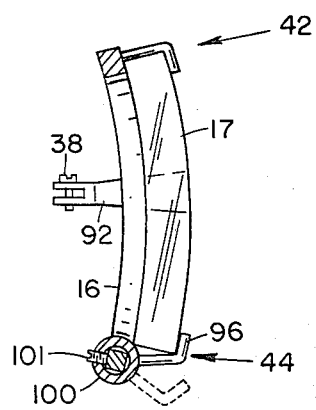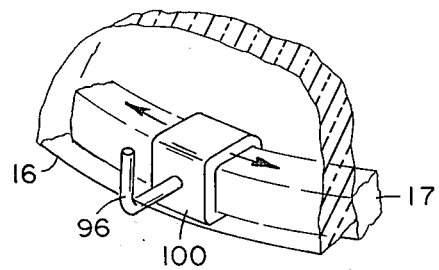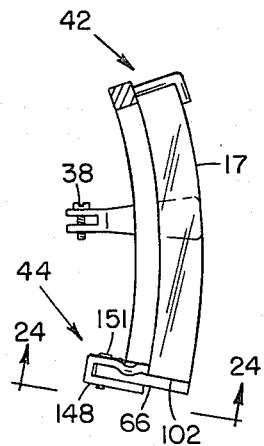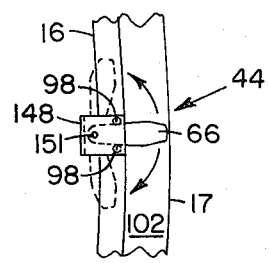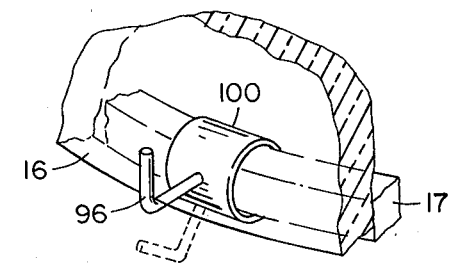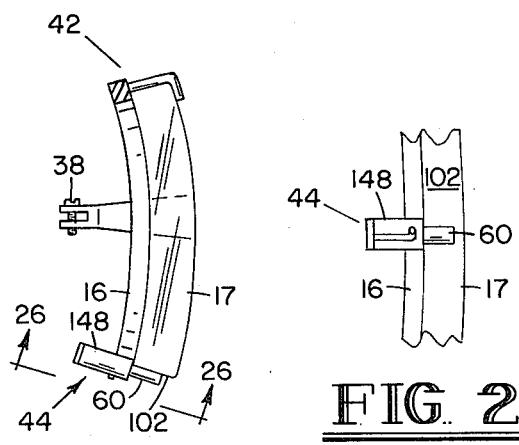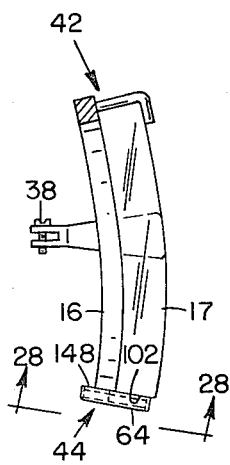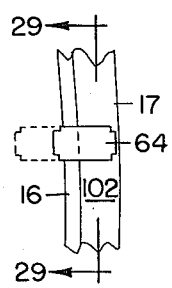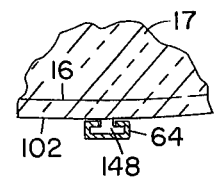

EYEGLASS FRAME HAVING REMOVABLE LENS

CROSS-REFERENCES TO RELATED APPLICATIONS

This application is a continuation-in-part of U.S. patent application Ser. No. 124,541, filed Feb. 25, 1980, now U.S. Pat. No. 4,304,469 entitled "Eyeglass Frames Having Removable Lens".

BACKGROUND OF THE INVENTION

1. Field of the Invention

This invention pertains to an improved design for eyeglass frames primarily intended for utilization with lenses of various types prescription, non-prescription, safety glasses or sunglasses. The eyeglass frames are constructed in a rather conventional manner insofar as lens frames and temple members are concerned. The modification resides in the manner of securing the lenses to the lens ring. The lens rings are constructed with stationary inner lens hooks, movable upper lens hooks and movable lower lens hooks. These hooks constructed and arranged to receive the detachable eyeglass lenses are movable in a variety of configurations.

2. Description of the Prior Art

The most closely related patent, to the knowledge of applicant, is the recent U.S. Pat. No. to Matthias, 4,176,921. The Matthias patent employs a conventional construction of lens rings and lens hooks. The Matthias patent utilizes a retaining clip mounted on the nose bridge with the clip tilting from a released position releasing the lenses to a closed position retaining the lenses. The distinction in design of this invention over the Matthias invention is the variation in hook means whereby the eyeglass lens are released or retained.

SUMMARY OF THE INVENTION

The eyeglass frames having removable lenses incorporated in the invention of this disclosure utilize eyeglass frames having two lens rings of relatively conventional outer configuration. These two lens frames are attached in the conventional manner by a nose bridge and employ a conventionally constructed first and second pads and first and second temple members having ear loops. The variation in the construction of the eyeglass frames of this invention resides primarily in the manner of securing the eyeglass lenses to the lens rings. Attached to the periphery of the lens rings is at least one movable lens hook. These hooks securely attached to the lens rings project over the lens rings to receive and secure the eyeglass lenses.

In summary, the movable lens hook may be either or both the upper and lower lens hooks attached to the lens rings of the eyeglass frames. Several species utilize various configurations of rotatable hooks and screwable hooks while other species use a spring loaded projection, a frictional slide projection, and a projecting tilt arm.

BRIEF DESCRIPTION OF THE DRAWINGS

For a detailed description of the construction of the eyeglass frame having removable lenses of this inventive concept, reference is made to the attached drawings wherein the construction of the preferred species and all related species are illustrated and will be described in the following detailed description.

FIG. 1 is a perspective view of an eyeglass frame having removable lenses utilizing a tilt catch temple lens latch.

FIG. 2 is a fragmented, side view of lens ring and temple illustrating the tilt catch in the locked position retaining the lens in the lens ring. An upper and lower lens hook is illustrated.

FIG. 3 is a fragmented, front view of lens ring retaining a lens in position illustrating the tilt catch in the released position.

FIG. 4 is a fragmented, side view of temple hinge utilizing a spring loaded projecting retention pin.

FIG. 5 is a fragmented, top view of a lens ring, lens, and temple utilizing a spring loaded latch pin.

FIG. 6 is a fragmented, sectional view of the spring loaded latch pin.

FIG. 7 is a fragmented, side view of frictionally retained slide clip retaining a lens in position.

FIG. 8 is a fragmented, sectional view of FIG. 7 taken substantially on line 8—8 of FIG. 7 in the direction of the arrows.

FIG. 9 is a fragmented, side view of a lens retained by a modification of a tilt catch temple lens latch.

FIG. 10 is a fragmented, side view of a swing clip constructed with an integral retention pin.

FIG. 11 is a fragmented view of the swing projecting arm with an integral latch pin in the open position.

FIG. 12 is a fragmented, side view of lens ring and temple with hinge employing a detachable retention pin.

FIG. 13 is a fragmented, side view of lens ring, temple, and hinge illustrating a modification of the detachable retention pin.

FIG. 20 is a fragmented, cross-sectional view of lens ring and temple illustrating a variation of the screw mount lens hook in FIG. 19.

FIG. 21 is a fragmented, perspective view of the lens hook shown in FIG. 19.

FIG. 22 is a fragmented, perspective view of the lens hook shown in FIG. 20.

FIG. 23 is a fragmented, cross-sectional view of lens ring and temple illustrating a tilt lens hook to release and retain a lens in a lens ring.

FIG. 24 is a view taken along line 24-24 of FIG. 23, showing the operation of the tilt lens hook.

FIG. 25 is a fragmented, cross-sectional view of lens ring and temple illustrating a spring loaded retention pin lens hook to release and retain the lens in the lens ring.

FIG. 26 is a view taken along lines 26-26 of FIG. 25 showing the operation of the spring loaded retention pin lens hook.

FIG. 27 is a fragmented, cross-sectional view of lens ring and temple illustrating a slide clip lens hook to release and retain the lens in the lens ring.

FIG. 28 is a view taken along lines 28-28 of FIG. 27 showing the operation of the slide clip lens hook.

FIG. 29 is a view taken along lines 29-29 of FIG. 28 showing the configuration of the slide clip lens hook.

DETAILED DESCRIPTION OF THE PREFERRED EMBODIMENT

Figure 14:
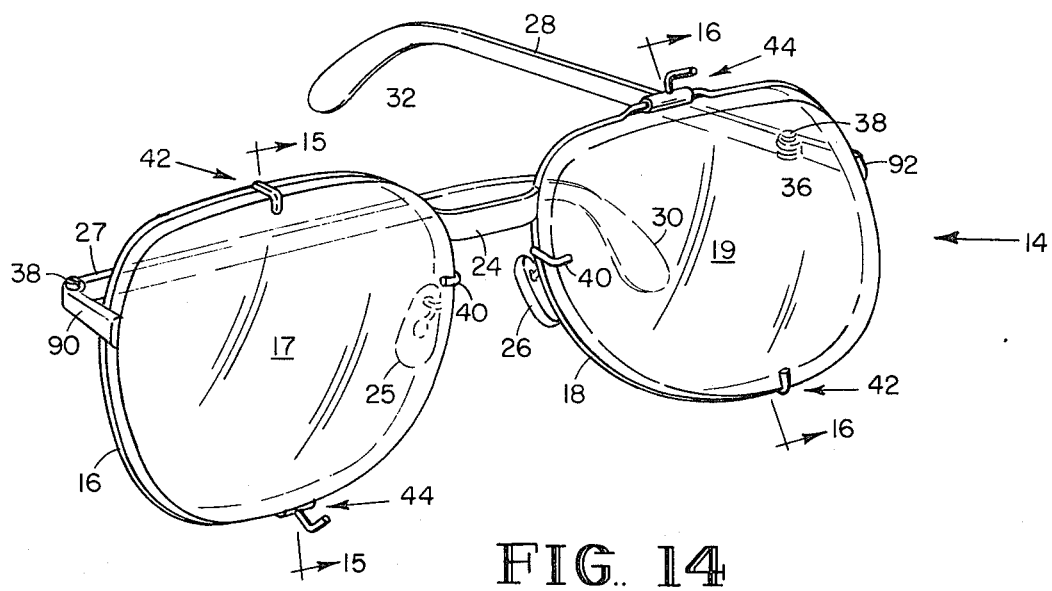
FIG. 14 is a perspective view of an eyeglass frame having removable lenses illustrating a rotatable upper lens hook and a rotatable lower lens hook.

For a detailed description of the preferred embodiment and the various species, reference is made to the attached several views wherein identical reference characters will be utilized to refer to identical or equivalent components throughout the various views and the following description.

The construction of the eyeglass frames 14 are rather conventional as illustrated in FIG. 1. They utilize a first lens ring 16 retaining a first lens 17 and a second lens ring 18 retaining a lens 19. The two lens rings 18 and 19 are secured in an integral structure with a nose bridge 24 and the lens rings 18 and 19 are equipped with a first nose pad 25 and a second nose pad 26 of conventional construction. The eyeglass frames 14 include a first temple member 27 and a second temple member 28 having first and second ear loops 30 and 32. The temples 27 and 28 are attached to the eyeglass frames 14 utilizing a conventional construction for a first and a second temple hinge 34 and 36. The temple members are secured to the eyeglass frame 14 by means of conventional hinge pins 38.

The variation in construction of eyeglass frames 14 disclosed in parent application Ser. No. 124,541 resides in the manner in which the first and second lenses 17 and 19 are secured to the first and second lens rings 16 and 18. The lenses 17 and 19 are secured to the lens rings 16 and 18 by means of their sliding under and being grasped by inner lens hooks 40 and upper lens hooks 42 as well as lower lens hook 44. These various hooks project outward from the lens rings 16 and 18 and project over the lenses 17 and 19. Engagement is constructed in a relatively loose, slidable, grasping contact. The first and second lenses 17 and 19 are locked into a relatively firm position on the lens rings 16 and 18 by means of a movable temple lens latch 46. The various species of the invention disclosed in parent application of Ser. No. 124,541 reside in the various configurations and constructions of the temple lens latch 46.

The preferred embodiment of the invention in application Ser. No. 124,541 is illustrated in FIGS. 1-3, which consist of a temple extension 48 into which is formed or machined a latch slot 49. The latch arm 50 is tiltably mounted in the latch slot 49 and secured into position by means of a latch pin 51 which, in movement from a vertical position to a horizontal position, moving over a detent 52. This construction provides a slight restriction to the rotation of latch arm 50 tending to retain the latch arm in the forward projecting position as illustrated in FIG. 1. In this configuration the lens is retained in engagement with the various lens hooks 40, 42 and 44. When the latch arm 50 projects forward as illustrated in FIG. 1, the lens cannot be removed from first lens ring 16 nor the second lens ring 18. If the lens arm 50 is tilted upward into a position relatively normal to temple members 37 and 38, FIG. 3, the first and second lenses 17 and 19 may be readily removed from the eyeglass frames 14. This readily detachable resecuring feature permits an interchangeability of lenses of varying densities or permits changing from the shaded sunglass type lens to the light amber shooting glass lens.

The second species of the invention of application Ser. No. 124,541 is illustrated in FIGS. 4, 5 and 6. The construction visualized in this embodiment incorporates a latch slide 56 in lieu of the tilting latch arm 50 described in the species above. The latch slide 56, as visualized, is illustrated in detail in FIGS. 4 and 6. Latch slide 56 is mounted in a structure somewhat equivalent to temple extension 48. Temple extension 48 is constructed with a recess to which is mounted a latch spring 58 which spring loads latch pin 60 in the extended position. A small detent may be provided in the temple extension 48 to retain the latch pin 60 in a desired position.

Another embodiment of the invention of application Ser. No. 124,541 is illustrated in FIG. 7, which is referred to as a slide clip 64. This configuration of the invention visualizes a slide clip 64 having a configuration generally as illustrated in FIG. 8 which permits the slide clip 64 moving along the temple extension 48 from a lens latched position as illustrated in FIG. 7 and when retracted toward the temple hinge 34, 36 to release the lenses 17 and 19.

Another configuration of the device is as illustrated in FIG. 9. This is considered to be a modification of the first species of the invention as previously described. A rotating-like arm comprising the tilt clip 66 is mounted on the exterior of temple extension 48 by means of a latch pin 51.

Another configuration of the device of this invention is illustrated in FIGS. 10 and 11. This device comprises a swing clip 70 which is tiltably mounted on the first and second temple hinges 34 and 36 pivotally retained by the hinge pins 38. In this configuration of the device the lenses 17 and 19 are locked in position as illustrated in FIG. 10. When it is desired to change or release the lenses, the swing clip 70 is moved to the position illustrated in FIG. 11. The manner in which the swing clip 70 is retained in position on the temple extension 48 is by means of a friction lock 72 which is forced over and grasped temple extension 48.

Other methods of retaining the lenses 17 and 19 in position are illustrated in FIGS. 12 and 13. A small, threaded aperture can be machined in the end of temple extension 48. A retention pin 76 engages the temple extension 48 by means of retention pin threads 78 in the temple extension 48 threadably engaging the retention pin screw threads 80.

Figure 15:
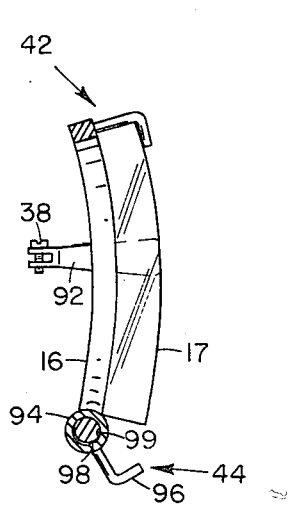
FIG. 15 is a fragmented, cross-sectional view of lens ring and temple illustrating a rotatable lower lens hook in the open position to release a lens in the lens ring and an upper fixed lens hook.
Figure 16:
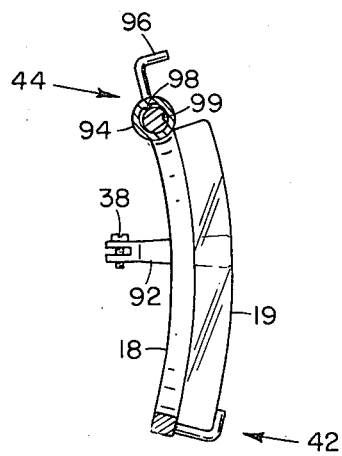
FIG. 16 is a fragmented, cross-sectional view of lens ring and temple illustrating a rotatable upper lens hook in the open position to release a lens in the lens ring, and a fixed lower lens hook.

The preferred embodiment of this invention is shown in FIGS. 14-16. The eyeglass frame 14 are conventional in construction having a pair of lens rings 16 and 18 connected by nosepiece 24 and receiving a pair of lenses 17 and 19, respectively. Nose pads 25 and 26 are secured between lens rings 16 and 18. Temple members 27 and 28 having ear loops 30 and 32 attach to temple extension 90 and 92 by conventional hinge pins 38. The invention of this application resides in the movable upper and/or lower lens hook 44. Movement of the upper lens hook and/or the lower lens hook 44 allows lens 17 and 19 to be easily removed from their respective lens rings 16 and 18. As shown in FIG. 14 and the remaining FIGS. 15-29, the movable lens hook is designated 44 while the fixed lens hook is designated 42 regardless of whether the lens hook is the upper or lower lens hook. It is preferred that only the upper lens hooks or only the lower lens hooks be capable of moving although having both upper and lower lens hooks capable of moving is equally contemplated. The various species of movable lens hooks will be discussed below. Although in the drawings the upper lens hook 42 is shown stationary and the lower lens hook 44 is shown movable, it is equally contemplated that upper lens hook 42 be movable while lower lens hook 44 remains stationary. The selection of the hook, upper or lower, to be movable is merely a matter of design and choice.

In FIG. 15, upper lens hook 42 is stationary and fixedly attached to lens ring 16. Movable lens hook 44, shown in the open position, comprises cylinder 94 integral with hook 96. Inside cylinder 94, bump 98 and notch 99 cooperate to obtain a locking type mechanism that prohibits hook 96 from moving out of the closed position unless acted upon by pressure. Finger pressure is all that is necessary to disengage bump 98 from notch 99 and allow hook 96 to rotate and release lens 17.

FIG. 16 shows the same type of rotating hook as in FIG. 15 except the lower lens hook is stationary while the upper lens hook is rotatable. Again bump 98 cooperates with notch 99 to hold hook 96 (fixed to cylinder 94) of lens hook 44 in a closed position.

Figure 17:
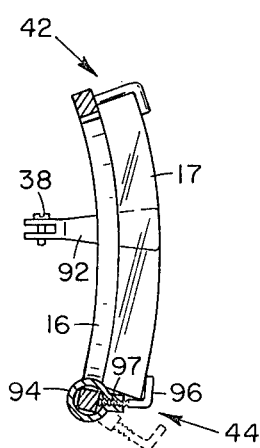
FIG. 17 is a fragmented, cross-sectional view of lens ring and temple illustrating a rotatable screw lens hook to release and retain the lens in the lens ring.

Another rotatable lens hook is shown in FIG. 17. To disengage lens hook 44 from the closed position retaining lens 17, hook 96, having one end 97 threaded into rotatable cylinder 94, is twisted a few turns then rotated by means of cylinder 94. The open or release position of low lens hook 44 is shown by dashed lines. In the open position, lens 17 is free to be removed and another lens placed in lens ring 16. Lens hook 44 is then returned to the closed or retaining position by rotating hook 96 still threaded into cylinder 94 upward and finally twisting hook 96 to snugly engage lens 17. In the species of FIG. 17, hook 96, whether in the closed or open position, is always engaged with cylinder 94 in contrast to the species of FIG. 18 to be discussed below.

Figure 18:
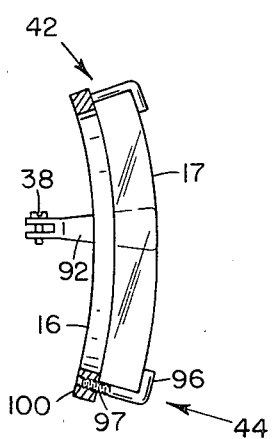
FIG. 18 is a fragmented, cross-sectional view of lens ring and temple illustrating a screwable lens hook to release and retain the lens from the lens ring.

The species of movable lens hook shown in FIG. 18 is similar to the species of FIG. 17 in that hook 96 having a threaded end 97 is twisted to disengage hook 96 from lens 17. However, in the species of FIG. 18, hook 96 is threaded into a stationary non-rotatable mount 100. To remove lens 17 from lens ring 16, hook 96 is twisted completely out of stationary mount 100. A new lens is then placed in lens ring 16 and hook 96 is screwed back into place in stationary mount 100.

Figure 19:
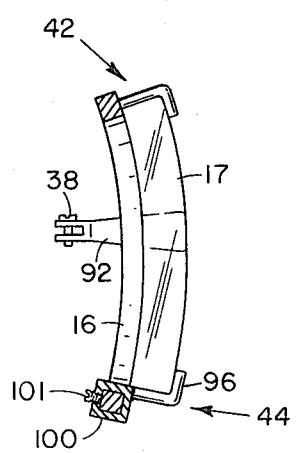
FIG. 19 is a fragmented, cross-sectional view of lens ring and temple illustrating a screw mount lens hook to release and retain the lens from the lens ring.

FIGS. 19-22 illustrate lens hook species in which hook 96 retaining lens 17 is permanently affixed to mount 100. To remove lens 17 from lens ring 16, screw 101 threaded into mount 100 opposite hook 96 is twisted enough to loosen mount 100 on lens ring 16. The entire lens hook 44 comprising hook 96, mount 100 and screw 101 is then moved to a position on lens ring 16 to allow lens 17 to freely be removed from lens ring 16. A new lens is then inserted in lens ring 16, hook 44 is placed back into position to retain the new lens and subsequently screw 101 is twisted to tighten mount 100 on lens ring 16 and thereby enable hook 96 to retain lens 17. In FIGS. 19 and 21, a rectangular mount 100 is shown attached to a rectangular lens ring 16 while in FIGS. 20 and 22 a round mount 100 is shown attached to a rectangular lens ring 16. Either combination is suitable. Variations of these combinations are also contemplated by the invention.

FIG. 23 shows a species of movable lower lens hook utilizing the same basic mechanism as the temple latches illustrated in FIG. 2 and 9. Lens hook 44 comprises a lens extension 148 secured to lens ring 16. Tilt catch 66 pivots to retain or release lens 17. As shown, tilt catch 66 is retaining lens 17 in lens ring 16. In contrast to previously discussed movable lens hook species, the lens hook 44 of FIG. 23 does not have a hook per se. However, lens 17 is still securely held in position in lens ring 16 by tilt catch 66 contacting the bottom edge 102 of lens 17 and pressing the lens 17 upward in tight engagement with stationary upper lens hook 42.

FIG. 24 more clearly shows the operation and configuration of the movable lens hook 44 taken along line 24—24 of FIG. 23. Lens extension 148 is securely fixed to lens ring 16. Tilt catch 66 pivots on pin 151 to enable lens 17 to be retained (as shown in solid lines) or released (as shown in dashed lines). With tilt catch 66 in the positions indicated by dashed lines, lens 17 is easily released from lens ring 16. Insertion of a new lens 17 into lens ring 16 then pivoting tilt catch 66 to the retaining position secures the new lens 17. Bumps 98 on either side tilt catch 66 maintain that catch 66 is a selected position to prevent the tilt catch from moving back and forth from the open and closed positions involuntarily. As discussed previously, mere finger pressure is enough to overcome the resistance from bump 98 and move tilt catch 66 into its desired position.

FIG. 25 illustrates the species of movable lower lens hook 44 having a mechanism similar to the spring loaded pin mechanisms shown in FIGS. 5 and 6. Lens extension 148 having spring loaded pin 60 is secured to lens ring 16. In the extended position as shown, spring loaded pin 60 presses firmly against the bottom edge 102 of lens 17 forcing lens 17 upward and against upper lens hook 42 thereby securely retaining lens 17. Compressing spring loaded pin 60 into lens extension 148 permits lens 17 to be released and a new lens inserted into lens ring 16. Spring loaded pin 60 when released projects back into the position as shown in FIG. 25.

FIG. 26 more clearly shows the operation and configuration of movable lens hook 44 taken along line 26—26 of FIG. 25. Detailed views of the spring loading mechanisms for spring loaded pin 60 are shown in FIGS. 4 and 6. Although FIGS. 4 and 6 relate to the temple latches, the subject of the invention in U.S. patent application Ser. No. 124,541, the same mechanisms are suitable to be utilized as the movable upper or lower lens hooks of the present invention.

Another species of movable lens hook is shown in FIGS. 27-29. Lower lens hook 44 is a slide clip 64 slidably engaging lens extension 148 secured to lens ring 16. Slide clip 64 engages the bottom edge 102 of lens 17 and forces lens 17 upward and against upper lens hook 42. The mechanism for this species of lens hook 44 is similar to that previously discussed for the slide clip temple latch illustrated in FIG. 7. The relationship of slide clip 64 and lens extension 148 is more clearly shown in FIG. 28 which is a view taken along line 28—28 of FIG. 27. Pushing slide clip 64 back over lens extension 148 as shown by the dashed lines releases lens 17 from lens ring 16 and permits a new lens 17 to be inserted. Sliding clip 64 forward into the original position as shown in FIG. 28 retains lens 17 in lens ring 16. FIG. 29, a view taken along line 29—29 of FIG. 28, clearly illustrates the configuration of the slide clip movable lens hook.

Although all the FIGS. 15-29, with the exception of FIG. 16, show the invention movable lens hook as the lower lens hook, the various species of movable lens hooks can also be applied to permit upper lens hooks to be movable while lower lens hooks are stationary. The invention contemplates a movable lens hook and whether that lens hook is the upper or lower lens hook is merely a matter of choice.

The invention disclosure has described several embodiments to enable lenses to be easily and readily removed from and replaced in eyeglass frames. Safety, prescription and sunglasses lenses may all be utilized with the invention eyeglass frames having movable hooks. In addition to retaining a single lens as illustrated in the drawings, the movable hooks of the invention may also function to retain a second lens, over a first lens, the second lens being removable while the first lens is permanently installed in the eyeglass frame. With this type of capability, the invention eyeglass frames can function for example as prescription glasses then be converted to safety glasses by merely inserting safety lenses in front of the permanently installed prescription lenses and then securing same by means of any one of the species of movable lens hooks as previously described. The same procedure can be followed for converting prescription eyeglasses to prescription sunglasses by simply securing tinted removable sunglass lenses using the invention movable lens hooks.

OPERATION OF THE DEVICE

The purpose of this invention is to permit a changing of the first and second lenses 17 and 19 as desired by the user. Although the device of this invention is visualized primarily for utilization in sunglasses or shooting glasses wherein various densities of lenses might be utilized, all variations in lenses are possible, such as a shifting from a prescription lens to a non-prescription lens, or the interchangeability of prescription lenses. Polarized glass might be utilized or various tints or shades interchangeable. The device of this invention, in effect, provides a slot into which the lenses 17 and 19 project and they are secured into position by one or more movable hooks 42 and movable lower hooks 44. The construction of the device of this invention has been described in detail. What is desired to be claimed is all modifications and adaptations of this invention not departing from the scope of equivalents as defined in the appended claims.

I claim:

1. An eyeglass frame adapted to receive removable lense comprising:
   a. a pair of lens rings connected by a nosebridge;
   b. temple means secured to each of said lens rings;
   c. multiple lens hooks secured to said lens rings, said hooks and said lens rings adapted to receive and retain eyeglass lenses, and at least one of said lens hooks being movable to allow said eyeglass lenses to be retained and removed from said lens rings, said movable lens hook comprising a cylinder mounted on each of said lens rings and a hook secured to said cylinder and wherein said cylinder and said hook form an integral unit and said integral unit rotates.

2. An eyeglass frame adapted to receive removable lense comprising:
   a. a pair of lens rings connected by a nosebridge;
   b. temple means secured to each of said lens rings;
   c. multiple lens hooks secured to said lens rings, said hooks and said lens rings adapted to receive and retain eyeglass lenses, and at least one of said lens hooks being movable to allow said eyeglass lenses to be retained and removed from said lens rings, said movable lens hook comprising a cylinder mounted on each of said lens rings and a hook secured to said cylinder and wherein said hook is threaded into said cylinder and said cylinder is non-rotatable.

3. An eyeglass frame adapted to receive removable lense comprising:
   a. a pair of lens rings connected by a nosebridge;
   b. temple means secured to each of said lens rings;
   c. multiple lens hooks secured to said lens rings, said hooks and said lens rings adapted to receive and retain eyeglass lenses, and at least one of said lens hooks being movable to allow said eyeglass lenses to be retained and removed from said lens rings, said movable lens hook comprising a lens extension secured to each of said lens rings and a spring loaded pin movably connected to said lens extension, said spring loaded pin adapted to release and retain said eyeglass lens.

4. An eyeglass frame adapted to receive removable lense comprising:
   a. a pair of lens rings connected by a nosebridge;
   b. temple means secured to each of said lens rings;
   c. multiple lens hooks secured to said lens rings, said hooks and said lens rings adapted to receive and retain eyeglass lenses, and at least one of said lens hooks being movable to allow said eyeglass lenses to be retained and removed from said lens rings, said movable lens hook comprising a lens extension secured to each of said lens rings and a slide clip movably connected to said lens extension, said slide clip adapted to release and retain said eyeglass lens.

* * * * *